US012241464B2

(12) United States Patent
Dai et al.

(10) Patent No.: US 12,241,464 B2
(45) Date of Patent: Mar. 4, 2025

(54) FULL-PLASTIC LIQUID PUMP

(71) Applicant: Xiamen Daida Technology Co., Ltd., Xiamen (CN)

(72) Inventors: Hengxing Dai, Xiamen (CN); Yujian Yang, Xiamen (CN)

(73) Assignee: Xiamen Daida Technology Co., Ltd., Xiamen (CN)

(*) Notice: Subject to any disclaimer, the term of this patent is extended or adjusted under 35 U.S.C. 154(b) by 0 days.

(21) Appl. No.: 18/346,798

(22) Filed: Jul. 4, 2023

(65) Prior Publication Data

US 2024/0280117 A1 Aug. 22, 2024

(51) Int. Cl.
*F04B 9/14* (2006.01)
*B05B 11/10* (2023.01)
*F04F 1/06* (2006.01)

(52) U.S. Cl.
CPC ................ *F04B 9/14* (2013.01); *B05B 11/10* (2023.01); *F04F 1/06* (2013.01)

(58) Field of Classification Search
CPC ........ F04B 9/14; B05B 11/0005; B05B 11/10; B05B 11/1042; B05B 11/01; B05B 11/1001
See application file for complete search history.

(56) References Cited

U.S. PATENT DOCUMENTS 5,401,148 A * 3/1995 Foster ................. B05B 11/0064 417/547
5,775,547 A * 7/1998 Foster ................. B05B 11/1061 222/321.9
5,992,704 A * 11/1999 Jager-Waldau ..... B05B 11/1074 222/321.9
10,335,816 B1 * 7/2019 Arminak ............. B05B 11/1059

FOREIGN PATENT DOCUMENTS

| | | | | |
|---|---|---|---|---|
| CA | 3064689 C | 9/2021 | | |
| CN | 111924316 | * 11/2020 | ......... | B05B 11/1043 |
| CN | 112340224 A | 2/2021 | | |
| CN | 216071257 U | 3/2022 | | |
| CN | 217049758 U | * 7/2022 | ......... | B05B 11/1035 |
| DE | 1254970 B | 11/1967 | | |
| JP | 2022516184 A | 2/2021 | | |
| WO | 2006122983 A | 11/2006 | | |

OTHER PUBLICATIONS

English Translation of CN217049758 from Espacnet website generated Sep. 25, 2024. (Year: 2024).*
English Translation of CN111924316 from Espacnet website generated Oct. 11, 2024. (Year: 2024).*

* cited by examiner

*Primary Examiner* — Bryan M Lettman

(57) ABSTRACT

A full-plastic liquid pump includes a pump body, a pump head, a piston, a spring, a threaded cover, a one-way valve, and a suction pipe. Two ends of the pump head are respectively provided with a liquid outlet and a sliding pressing rod. The middle portion of the slidable pressing rod movably passes through a cover hole formed of the threaded cover. A piston is connected with the inner wall of the pump body to divide the inner space of the pump body into an air pressure cavity and a liquid storage cavity. A vent hole is formed in the upper portion of the pump body. An axial through hole is formed in the center of the piston. A lower end of the spring is fixed in the liquid storage cavity. The one-way valve is fixed in the liquid storage cavity corresponding to the suction pipe.

10 Claims, 12 Drawing Sheets

FULL-PLASTIC LIQUID PUMP

CROSS REFERENCE TO RELATED APPLICATION

This non-provisional patent application claims priority under 35 U.S.C. § 119 from Chinese Patent Application No.202310138661X filed on Feb. 20, 2023, the entire content of which is incorporated herein by reference.

TECHNICAL FIELD

The disclosure relates to pumps technologies, in particular to a full-plastic liquid pump.

BACKGROUND

Nowadays, as a common pressing type liquid taking device in daily life, a liquid pump is widely applied to bottle-shaped packaging of daily chemical products. For example, the liquid pump is applied to bottle-shaped packaging of washing products such as surface washing liquid, hand sanitizer, shampoo, shower gel, disinfectant, powder base liquid and the like. The liquid pump is mainly connected with a bottle mouth of a bottle-shaped package through a thread or a clamping sleeve, so as to extrude and use the liquid in the bottle-shaped package by manually pressing a pump head. In the prior art, the bottle-shaped package is usually a bottle body made of plastic, and the liquid pump generally includes a pump body, the pump head, and a spring. The pump body is made of plastic; the spring is arranged inside the pump body or the pump head and is used for restoring the pump head to the original position after users remove a downward pressing effect applied to the pump head; and in a resetting process of the pump head, the pump head sucks the liquid in the bottle body into a liquid storage cavity of the liquid pump for next pumping extrusion. Most existing springs are made of metal. The spring made of the metal material can be easily rusted due to contact with liquid in the bottle body for a long time, so that the liquid is polluted, and the bottle body and the liquid pump need to be separated and recycled in a recycling process, so that unified processing cannot be performed, and the recycling process is time-consuming and labor-consuming.

A Chinese utility model patent document with the application number CN202120294643.7 discloses a plastic spring emulsion pump, which includes an emulsion pump head, an emulsion pump body, a piston rod, a plastic spring, a threaded cover, a gasket, a piston fixing sleeve, a piston, a ball valve, and a straw. By providing the plastic spring, the plastic spring emulsion pump utilizes the structural elasticity of the plastic part, so that a rib can be compressed downwards when being stressed, and a traditional metal spring is replaced. The use of the plastic spring enables the function of the liquid pump to be accomplished without the use of the metal spring. The use of the plastic spring can also replace the traditional metal spring, so that the emulsion pump can be completely recycled, and the recovery is convenient. However, due to the fact that the plastic spring of the plastic spring emulsion pump is arranged in the emulsion pump head and sleeves the piston rod, the emulsion pump head is arranged in the middle of the threaded cover in a pressing mode, and the emulsion pump head needs to be provided with the inner cavity for installing the spring, so that the outer diameter of the pump head needs to be large, the whole emulsion pump is large in appearance, large in manufacturing consumable, and high in production cost. In addition, the structure of each part of the plastic spring emulsion pump and the mutual connection relationship are not reasonable enough, so that an air inlet channel and a liquid outlet channel cannot be opened or closed in time, so that the liquid cannot be quickly adsorbed by large suction force. In addition, the plastic spring emulsion pump is lack of a locking assembly capable of timely locking and pressing the liquid according to needs, so that after the pump head is opened, once the pump head is pressed, the liquid can be squeezed out due to the fact that the pump head is pressed due to misoperation and the like, waste is caused, and environmental protection is not facilitated.

Therefore, the disclosure improves the structure of the existing liquid pump, and discloses a full-plastic liquid pump with reasonable design, all parts made of all plastics that can be recycled without sorting, energy saving and environmental protection, exquisite structure, less production consumables, low cost, and timely locking and pressing operation to avoid extruding liquid as required, so as to solve at least one technical problem existing in the prior art.

SUMMARY

It is an object of the present invention to aim at the defects in the prior art. a full-plastic liquid pump is provided. The full-plastic liquid pump is reasonable in design. All parts of the full-plastic liquid pump are made of all-plastic and can be recycled without sorting. Energy conservation and environmental protection are achieved. The structure of the full-plastic liquid pump is exquisite. Consumables of the full-plastic liquid pump are few, and the cost is low. The air inlet channel and the liquid outlet channel can be opened and closed in time, and the pressing operation can be locked in time according to needs to avoid extrusion of liquid.

The full-plastic liquid pump includes following schemes. The full-plastic liquid pump includes a pump body formed of plastic, a pump head, a piston, a spring, a threaded cover, a one-way valve, and a suction pipe. Two ends of the pump head are respectively provided with a liquid outlet and a sliding pressing rod. slidable pressing rod is internally provided with a liquid outlet channel in communication with the liquid outlet. The middle portion of slidable pressing rod movably passes through a cover hole formed in the center of an upper end of the threaded cover. An air inlet gap is formed between the peripheral side of slidable pressing rod and the cover hole. The interior of the upper end of the threaded cover is coaxially and fixed with the upper end of the pump body. The peripheral side of the piston is in sealed sliding connection with the inner wall of the pump body. The piston divides the inner space of the pump body into an air pressure cavity and a liquid storage cavity which are arranged from up to down. The air pressure cavity communicates with the outside atmosphere through the air inlet gap. A vent hole is formed in the side wall of the upper portion of the pump body. The vent hole is controlled by the piston to be communicated with the air pressure cavity. An axial through hole is formed in the center of the piston. The inner wall of the axial through hole is in sealed sliding connection with the peripheral side of a lower end of slidable pressing rod. A liquid outlet cavity is formed between the lower end of slidable pressing rod and the axial through hole. The liquid outlet cavity communicates with the liquid outlet channel. The lower end of the spring is fixed in the lower end of the liquid storage cavity. A liquid passing gap is formed between the peripheral side of the spring and the inner wall of the liquid storage cavity. The lower end of slidable pressing rod is connected with the upper end of the spring. slidable pressing rod drives the upper end of the spring and the piston to ascend and descend asynchronously to control the connection and disconnection between the liquid passing gap and the liquid outlet cavity. The bottom of the liquid storage cavity communicates with the upper end of the suction pipe. The one-way valve is fixed in the liquid storage cavity corresponding to the suction pipe and used for controlling liquid to flow unidirectionally from the suction pipe to the liquid storage cavity.

Furthermore, the full-plastic liquid pump includes a locking assembly. The locking assembly comprises a locking ring and a locking block. The locking ring is of a spiral annular structure and defines a notch allowing the locking block to pass through. The locking ring is integrally formed in the upper end of the cover hole. The locking block is fixed on the outer wall of slidable pressing rod. The locking block is driven by slidable pressing rod to pass through the notch or matched with the locking ring to prevent slidable pressing rod from ascending and descending.

Preferably, the spring includes a truncated cone seat, an elastic rib, and a circular ring base. The truncated cone seat and the circular ring base are fixed by a plurality of the elastic ribs arranged at intervals along the circumferential side to form an integrated structure. The circular ring base is fixed at the lower part of the liquid storage cavity. The liquid passing gap is formed between the peripheral side of the truncated cone seat and the inner wall of the liquid storage cavity. The truncated cone seat is provided with a conical surface. The conical surface is matched with a conical opening formed in the lower end of the axial through hole for controlling connection and disconnection between the liquid passing gap and the liquid outlet cavity. Two clamping hooks are arranged on the two sides of the top of the truncated cone seat respectively. The two clamping hooks are hooked to the two sides of the lower end of slidable pressing rod respectively.

Preferably, a number of the elastic ribs is two. The lower ends of the two elastic ribs are fixed to the left side and the right side of the upper surface of the circular ring base respectively. The upper ends of the two elastic ribs are fixed to the front side. The rear side of the lower surface of the truncated cone seat respectively.

Preferably, the projection of the two elastic ribs on a longitudinal plane is in the shape of “8”.

Preferably, the two elastic ribs are both in the shape of a bow.

Preferably, the lower portion of slidable pressing rod is provided with a first shaft shoulder for pressing the upper end of the piston. The lower end of slidable pressing rod is provided with a second shaft shoulder for pressing the upper end of the spring and a hook groove for connecting a spring clamping hook. A downward pressing distance between the first shaft shoulder and the piston is greater than the downward pressing distance between the second shaft shoulder and the spring.

Preferably, a limiting ring is arranged in the upper end of the threaded cover. The lower end of the limiting ring extending into the pump body is configured to limit the piston to move upwards.

Preferably, the outer wall of the limiting ring is in threaded connection with the inner wall of the upper end of the pump body.

Preferably, a clamping structure is arranged on the outer wall of the upper end of the pump body. The pump body is clamped inside the threaded cover through the clamping structure.

Preferably, the clamping structure includes an end surface ring. The end surface ring is fixed on the upper end surface of the pump body. A plurality of arc-shaped clamping rings are fixed to the upper surface of the end surface ring. A plurality of clamping pieces arranged at intervals are arranged on each of the clamping rings. The clamping pieces are clamped with a clamping groove formed in the threaded cover.

Preferably, the outer wall of the upper end of the pump body is sleeved with a sealing gasket. The sealing gasket is attached to the lower surface of the end surface ring.

Preferably, the piston is of a hollow cylindrical structure. An annular-shaped end surface groove is formed in the upper end and the lower end of the piston. An annular-shaped side surface groove is formed in the peripheral side of the piston.

Preferably, the one-way valve comprises a valve seat and a valve body. The lower end of the valve body and the upper end surface of the valve seat are fixed to form an integrated structure. A liquid inlet channel is formed in the valve body, the lower end of the liquid inlet channel extends to the lower end surface of the valve seat. Two inclined surfaces are symmetrically arranged on the two sides of the upper portion of the valve body. A line-shaped valve port is formed between the two inclined surfaces. The line-shaped valve port communicates with the upper end of the liquid inlet channel.

Preferably, the bottom of the liquid storage cavity is communicated with a connecting pipe cavity. The connecting pipe cavity is in interference fit connection with the upper end of the suction pipe.

The present invention adopting above schemes has the following beneficial effects.

1. The pump body, the pump head, the piston, the spring, the threaded cover, the one-way valve, and the suction pipe are all formed by plastic. Compared with a traditional liquid pump, all parts of the present invention are all plastic structures, can be completely recycled, and do not need to be sorted, thereby facilitating rapid unified recovery processing, saving time and labor, and being environmentally friendly and pollution-free. The spring formed by the plastic can prevent the liquid from being contaminated by rust when the spring is in contact with the liquid in a bottle body.

2. The lower end of slidable pressing rod of the pump head is directly connected to the upper end of the spring, which saves a piston rod of the traditional liquid pump. An inner cavity of slidable pressing rod does not need to be provided with the inner cavity for installing the spring, and only the liquid outlet channel needs to be arranged to be communicated with the liquid outlet, so that the outer diameter of slidable pressing rod becomes smaller, the consumables of slidable pressing rod, the pump head and the threaded cover are reduced, and the production cost is reduced.

3. The peripheral side of the piston is in sealed sliding connection with the inner wall of the pump body, so that the piston can divide the inner space of the pump body into the air pressure cavity and the liquid storage cavity which are arranged from up to down. The upper end of the spring and the piston are driven by slidable pressing rod to ascend and descend by reasonably optimizing the structure of each part and the connection relationship between the parts. Due to the fact that the downward pressing distance between the first shaft shoulder and the piston is larger than the downward pressing distance between the second shaft shoulder and the spring, the spring and the piston can ascend and descend asynchronously, and reasonable and efficient control over air inlet and liquid outlet of the bottle body is achieved. When slidable pressing rod presses the spring, the second shaft shoulder firstly presses against the upper end of the spring to press down to drive the upper end of the spring to move downwards. At this time, the spring is compressed, and the conical surface of the spring is separated from the conical opening of the axial through hole to be opened, so as to control the liquid passing gap to be in communication with the liquid outlet cavity. The internal space of the liquid storage cavity is reduced. Liquid pressure in the liquid storage cavity is increased. The liquid in the liquid storage cavity is extruded out of the liquid outlet after passing through the liquid gap, the liquid outlet cavity and the liquid outlet channel in sequence. During the pressing of the spring, the two inclined surfaces of the one-way valve close the line-shaped valve port under the action of the liquid in the liquid storage cavity. As slidable pressing rod continues to press the upper end of the spring, the first shaft shoulder presses against the upper end of the piston to drive the piston to move down together with the spring. At this time, the liquid passing gap is kept in communication with the liquid outlet cavity. The internal space of the air pressure cavity suddenly increases to form a negative pressure. The outside atmosphere enters the air pressure cavity through the air inlet gap. When the piston moves downwards away from the vent hole, the vent hole can be controlled to be in communication with the air pressure cavity. Air in the air pressure cavity passes through the vent hole, and the threaded cover enters the bottle body. The liquid of the bottle body is subjected to atmospheric pressure. After the downward pressure of slidable pressing rod on the upper end of the spring is removed, the spring drives the upper end of the spring to reset through an elastic force of the spring, so that the internal space of the liquid storage cavity becomes large, and the liquid pressure becomes small. Under the action of the atmospheric pressure, the liquid of the bottle body passes through the line-shaped valve port of the one-way valve through the suction pipe and enters the liquid storage cavity. As the upper end of the spring continues to move upwards, the conical surface of the spring is tightly attached to the conical opening of the axial through hole to be closed, so as to control the disconnection between the liquid passing gap and the liquid outlet cavity, and drive the piston to move up together. At this time, the disconnection between the liquid passing gap and the liquid outlet cavity is maintained. After the upper end of the spring is reset, the peripheral side of the piston shields the vent hole to control the disconnection between the vent hole and the air pressure cavity, thereby preventing the liquid in the bottle body from being affected by external air. The above schemes make a gas flow path and a liquid flow path more reasonable, and can have a large suction force to quickly adsorb the liquid under a mutual cooperation of the gas flow path and the liquid flow path.

4. The locking assembly may first manually control slidable pressing rod to rotate to drive the locking block to rotate above the notch. Then the pump head is pressed to drive slidable pressing rod to press the spring so that the liquid in the bottle body is extruded from the liquid outlet for use. The locking assembly can also manually control slidable pressing rod to rotate to drive the locking block to rotate to the upper surface of the locking ring when the pump head is pressed due to misoperation and the like, so that the locking block is clamped and supported on the locking ring to limit the descending of slidable pressing rod, thereby locking the pump head.

BRIEF DESCRIPTION OF THE DRAWINGS

In order to illustrate the technical solution in the embodiments of the disclosure or the prior art more clearly, a brief description of drawings required in the embodiments or the prior art is given below. Obviously, the drawings described below are only some of the embodiments of the disclosure. For ordinary technicians in this field, other drawings can be obtained according to the structures shown in these drawings without any creative effort.

Figure 1:
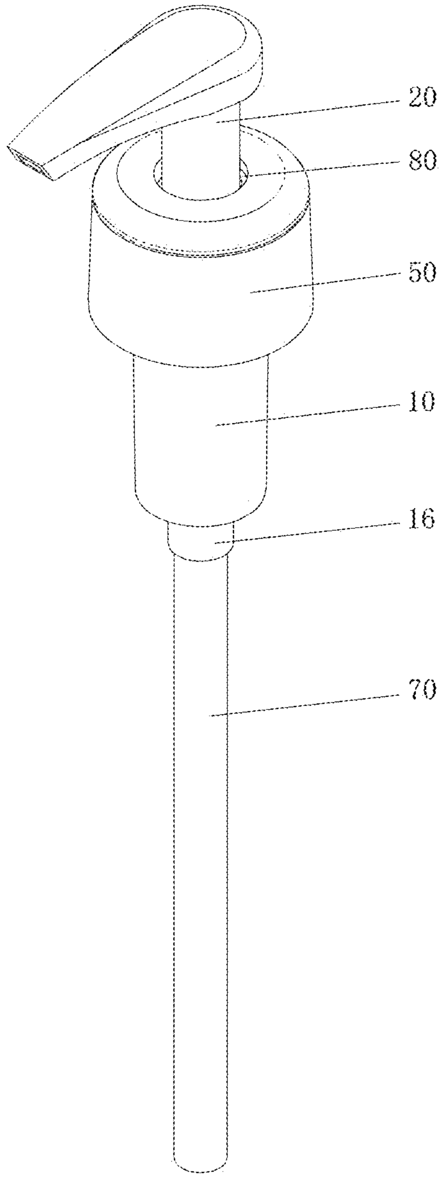
FIG. 1 illustrates a 3D structure diagram of a full-plastic liquid pump.
Figure 2:
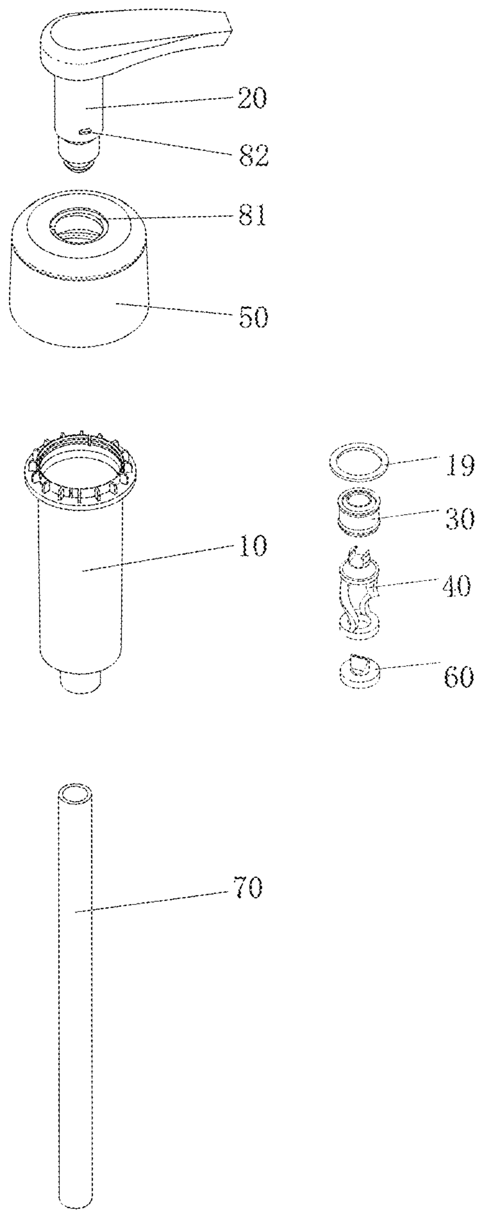
FIG. 2 illustrates a exploded-view schematic diagram of a full-plastic liquid pump.
Figure 3:
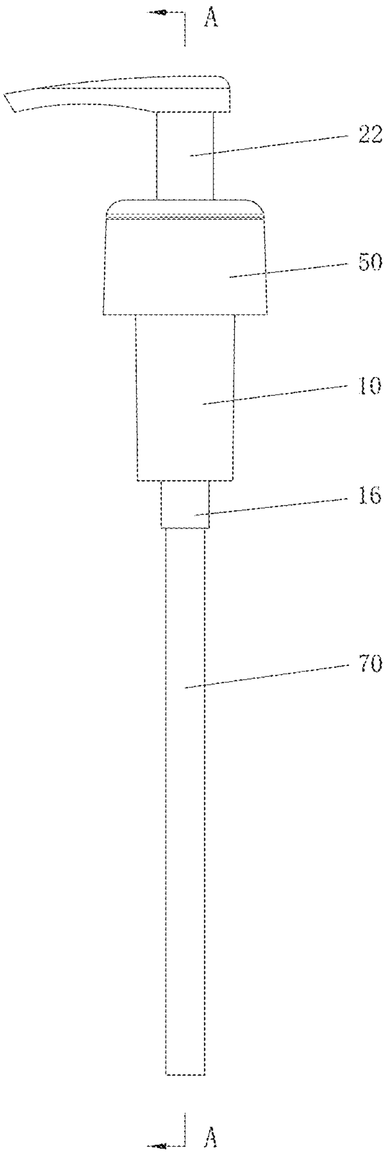
FIG. 3 illustrates a main structure diagram of a full-plastic liquid pump in a pressed state.

In figures, 10 is a pump body, 11 is an air pressure cavity, 12 is a liquid storage cavity, 13 is a vent hole, 14 is a liquid outlet cavity, 15 is a liquid passing gap, 16 is a connecting pipe cavity, 17 is an end surface ring, 18 is a clamping ring, 19 is a sealing gasket, 20 is a pump head, 21 is a liquid outlet, 22 is a sliding pressing rod, 23 is a liquid outlet channel, 24 is a first shaft shoulder, 25 is a second shaft shoulder, 26 is a hook groove, 30 is a piston, 31 is an axial through hole, 32 is a conical opening, 33 is an annular-shaped end surface groove, 34 is an annular-shaped side surface groove, 40 is a spring, 41 is a truncated cone seat, 42 is an elastic rib, 43 is a circular ring base, 44 is a conical surface, 45 is a clamping hook, 50 is a threaded cover, 51 is an air inlet gap, 52 is a limiting ring, 60 is a one-way valve, 61 is a valve seat, 62 is a valve body, 63 is a liquid inlet channel, 64 is an inclined surface, 65 is a line-shaped valve port, 70 is a suction pipe, 80 is a locking assembly, 81 is a locking ring, 82 is a locking block, 83 is a notch, 84 is a limited block.

DETAILED DESCRIPTION OF THE EMBODIMENTS

In the description of the present application, it should be understood that the orientations or positional relationships indicated by the terms “length”, “width”, “upper”, “lower”, “front”, “back”, “left”, “right”, “vertical”, “horizontal”, “top”, “bottom”, “inner”, “outer”, and the like are based on the orientations or positional relationships shown in the accompanying drawings, which are merely intended to facilitate and simplify the description of the present application only, but not to indicate or imply that the device or element referred to must have a particular orientation or be constructed and operated in a particular orientation, and therefore, cannot be interpreted as limiting the present application.

In addition, the terms "first" and "second" are merely for the sake of description, and cannot be understood as indicating or implying the relative importance or implicitly indicating the quantity of the indicated technical features. Therefore, the features defined by the terms "first" and "second" may explicitly or implicitly include one or more of these features. In the description of the present application, the term "plurality" refers to two or more, unless otherwise specifically defined.

In the description of the present application, unless otherwise explicitly specified and defined, the terms "mounted", "coupled", "connected", "fixed", and the like should be construed broadly, for example, the term "connected" may be fixed, detachably connected, or integrated connected; mechanically or electrically connected; directly or indirectly connected through a medium, intercommunication between two elements, or interaction between two elements. Those of ordinary skill in the art may understand the specific meanings of the above terms in the present application according to specific circumstances.

In order to understand the content of the present application more clearly and accurately, detailed descriptions will be provided with reference to the accompanying drawings. The drawings in the specification show examples of embodiments of the present application, where the same reference numerals represent the same elements. It should be understood that the proportions shown in the drawings of the specification are not actual proportions implemented in the present application, which are merely for illustrative purposes, and are not drawn according to original dimensions.

Referring to FIGS. 1-16, a full-plastic liquid pump provided includes a plastic molding pump body 10, a pump head 20, a piston 30, a spring 40, a threaded cover 50, a one-way valve 60, and a suction pipe 70. Two ends of the pump head 20 are respectively provided with a liquid outlet 21 and a sliding pressing rod 22. An inner of the slidable pressing rod 22 is provided with a liquid outlet channel 23 in communication with the liquid outlet 21. The pump body 10, the pump head 20, the piston 30, the spring 40, the threaded cover 50, the one-way valve 60, and the suction pipe 70 are plastic molded. Compared with a traditional liquid pump, all parts are plastic molding structures, which can be completely recycled, and do not need to be sorted, facilitating rapid unified recovery processing, saving time and labor, and being environmentally friendly and pollution-free. The spring 40 is plastic molded which can prevent the liquid from being contaminated by rust when the spring 40 is in contact with the liquid in a bottle body.

In order to have a large suction force to quickly extrude and adsorb the liquid in the bottle body, the structure of each part and the connection relationship therebetween are optimized, so that the gas flow path (a solid arrow shown in FIG. 4) and the liquid flow path (a dotted arrow shown in FIG. 5) are more reasonable. The middle portion of slidable pressing rod 22 movably passes through a cover hole formed in the center of an upper end of the threaded cover 50. An air inlet gap 51 is formed between the peripheral side of slidable pressing rod 22 and the cover hole. The interior of the upper end of the threaded cover 50 is coaxially and fixed with the upper end of the pump body 10. The peripheral side of the piston 30 is in sealed sliding connection with the inner wall of the pump body 10. The piston 30 divides the inner space of the pump body 10 into an air pressure cavity 11 and a liquid storage cavity 12 which are arranged from up to down. The air pressure cavity 11 communicates with the outside atmosphere through the air inlet gap 51. A vent hole 13 is formed in the side wall of the upper portion of the pump body 10. The vent hole 13 is controlled by the piston 30 to be communicated with the air pressure cavity 11. An axial through hole 31 is formed in the center of the piston 30. The inner wall of the axial through hole 31 is in sealed sliding connection with the peripheral side of a lower end of slidable pressing rod 22. A liquid outlet cavity 14 is formed between the lower end of slidable pressing rod 22 and the axial through hole 31. The liquid outlet cavity 14 communicates with the liquid outlet channel 23. The lower end of the spring 40 is fixed in the lower end of the liquid storage cavity 12. A liquid passing gap 15 is formed between the peripheral side of the spring 40 and the inner wall of the liquid storage cavity 12. The lower end of slidable pressing rod 22 is connected with the upper end of the spring 40. slidable pressing rod 22 drives the upper end of the spring 40 and the piston 30 to ascend and descend asynchronously to control the connection and disconnection between the liquid passing gap 15 and the liquid outlet cavity 14. The bottom of the liquid storage cavity 12 communicates with the upper end of the suction pipe 70. The one-way valve 60 is fixed in the liquid storage cavity 12 corresponding to the suction pipe 70 and used for controlling liquid to flow unidirectionally from the suction pipe 70 to the liquid storage cavity 12.

On a basis of the above structure, preferably, the lower portion of slidable pressing rod 22 is provided with a first shaft shoulder 24 for pressing the upper end of the piston 30. The lower end of slidable pressing rod 22 is provided with a second shaft shoulder 25 for pressing the upper end of the spring 40 and a hook groove 26 for connecting a spring clamping hook. A downward pressing distance between the first shaft shoulder 24 and the piston 30 is greater than the downward pressing distance between the second shaft shoulder 25 and the spring 40.

In this embodiment, the lower end of slidable pressing rod 22 of the pump head 20 is directly connected to the upper end of the spring 40, which saves a piston 30 rod of the traditional liquid pump. An inner cavity of slidable pressing rod 22 does not need to be provided with the inner cavity for installing the spring 40, and only the liquid outlet channel 23 needs to be arranged to be communicated with the liquid outlet 21, so that the outer diameter of slidable pressing rod 22 becomes smaller, the consumables of slidable pressing rod 22, the pump head 20 and the threaded cover 50 are reduced, and the production cost is reduced. The peripheral side of the piston 30 is in sealed sliding connection with the inner wall of the pump body 10, so that the piston 30 can divide the inner space of the pump body 10 into the air pressure cavity 11 and the liquid storage cavity 12 which are arranged from up to down. The upper end of the spring 40 and the piston 30 are driven by slidable pressing rod 22 to ascend and descend by reasonably optimizing the structure of each part and the connection relationship between the parts. Due to the fact that the downward pressing distance between the first shaft shoulder 24 and the piston 30 is larger than the downward pressing distance between the second shaft shoulder 25 and the spring 40, the spring 40 and the piston 30 can ascend and descend asynchronously, and reasonable and efficient control over air inlet and liquid outlet 21 of the bottle body is achieved.

Figure 4:
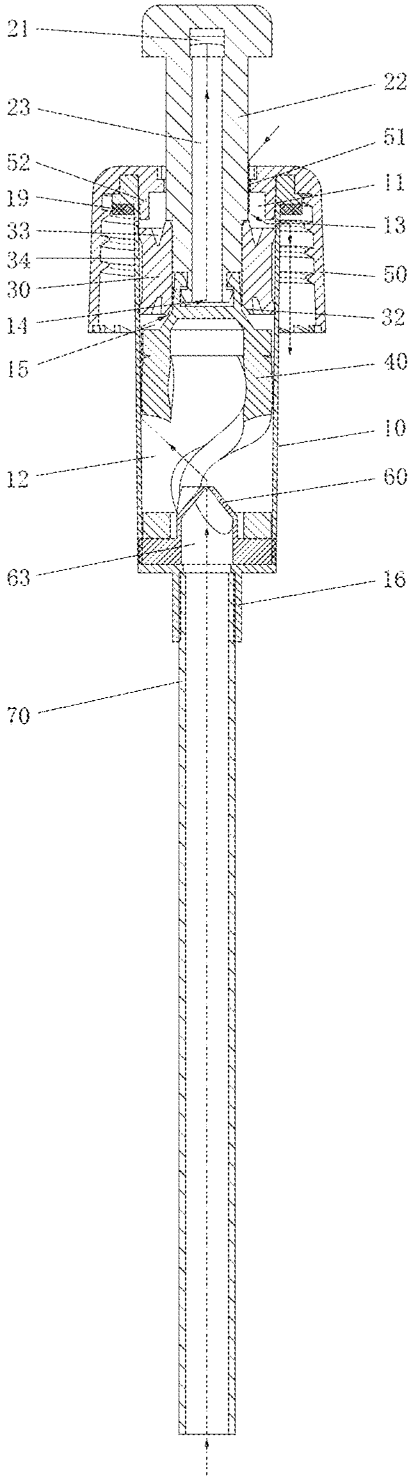
FIG. 4 illustrates a schematic diagram of the profile structure in the A-A direction in FIG. 3.
Figure 5:
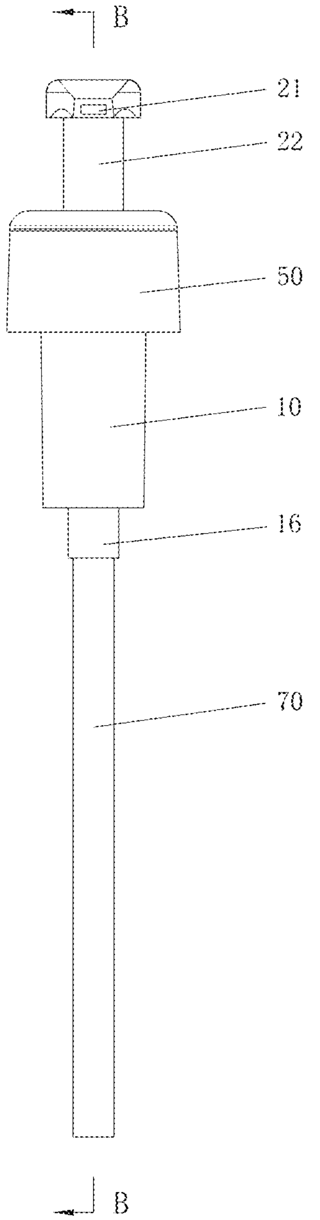
FIG. 5 illustrates a left view structure diagram of a full-plastic liquid pump in a non-pressed state.
Figure 6:
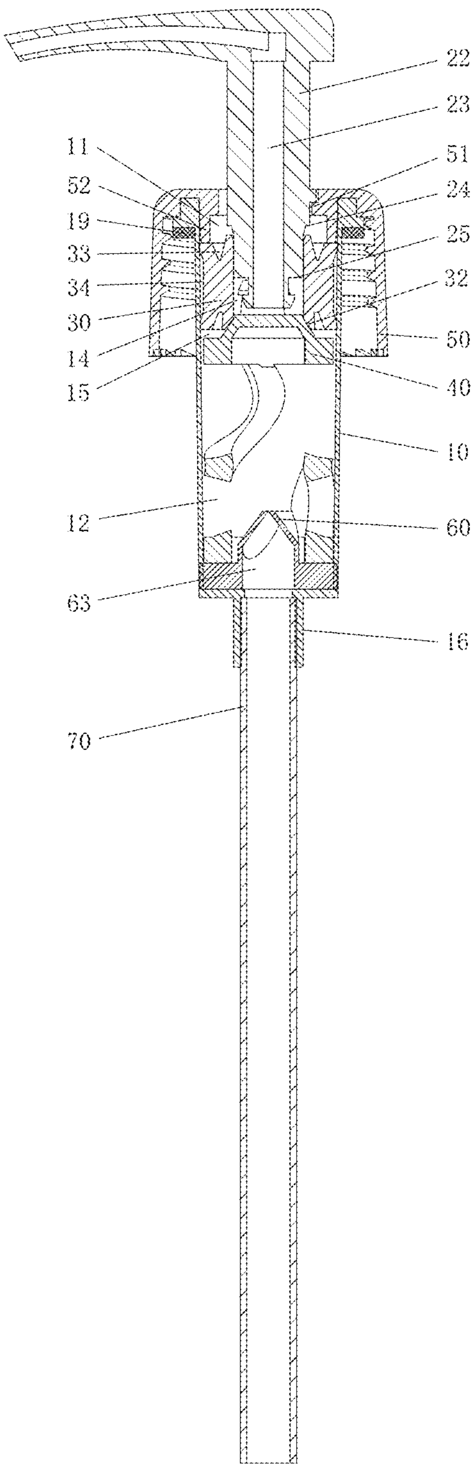
FIG. 6 illustrates a schematic diagram of the profile structure in the B-B direction in FIG. 5.

Please refer to FIG. 4 or FIG. 6. On the basis of the above structure, preferably, the bottom of the liquid storage cavity 12 is communicated with a connecting pipe cavity 16. The connecting pipe cavity 16 is in interference fit connection with the upper end of the suction pipe 70 to ensure a suction power of the suction pipe 70.

On a basis of the above structure, preferably, a limiting ring 52 is arranged in the upper end of the threaded cover 50. The lower end of the limiting ring 52 extending into the pump body 10 is configured to limit the piston 30 to move upwards.

Figure 7:
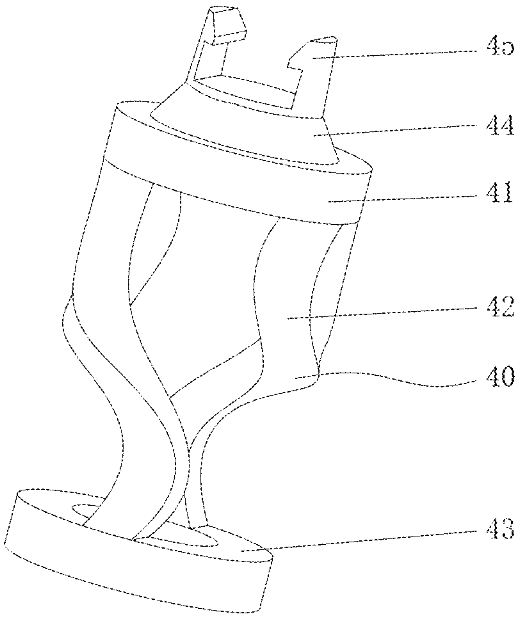
FIG. 7 illustrates a structure diagram of a spring from a first view.
Figure 8:
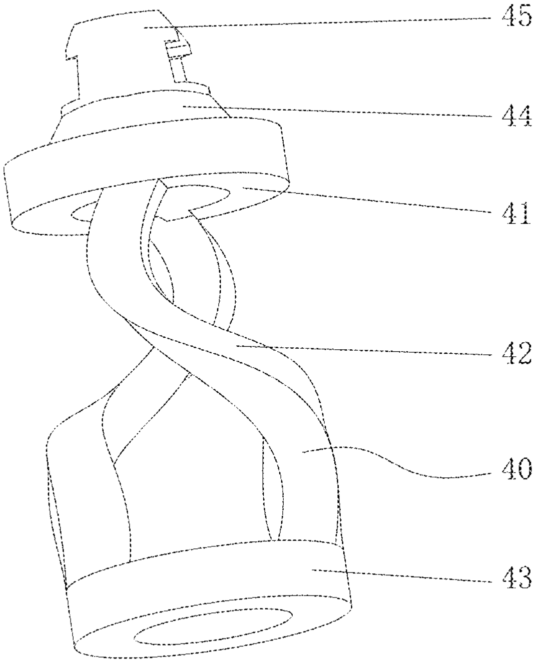
FIG. 8 illustrates a structure diagram of a spring from a second view.
Figure 9:
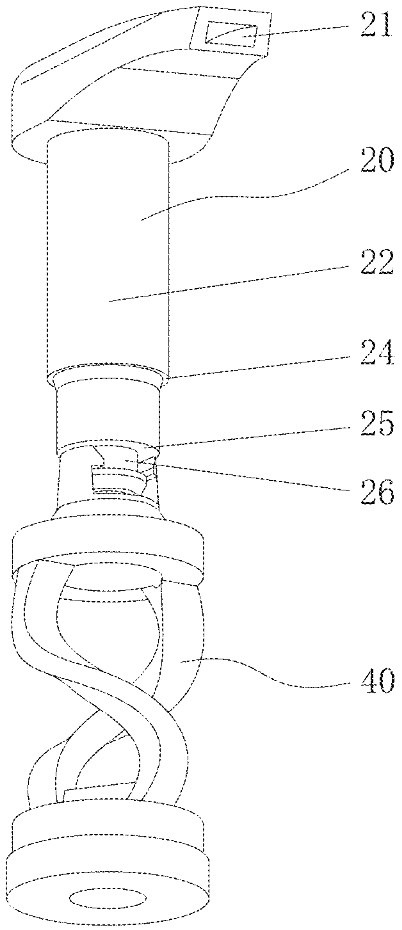
FIG. 9 illustrates a schematic diagram of a connection state between a spring and a pump head, and a one-way valve.

Referring to FIG. 7, FIG. 8, or FIG. 9, in this embodiment, on the basis of the above structure, the spring 40 includes a truncated cone seat 41, an elastic rib 42, and a circular ring base 43. The truncated cone seat 41 and the circular ring base 43 are fixed by a plurality of the elastic ribs 42 arranged at intervals along the circumferential side to form an integrated structure. The circular ring base 43 is fixed at the lower part of the liquid storage cavity 12. The liquid passing gap 15 is formed between the peripheral side of the truncated cone seat 41 and the inner wall of the liquid storage cavity 12. The truncated cone seat 41 is provided with a conical surface 44. The conical surface 44 is matched with a conical opening 32 formed in the lower end of the axial through hole 31 for controlling connection and disconnection between the liquid passing gap 15 and the liquid outlet cavity 14. Two clamping hooks 45 are arranged on the two sides of the top of the truncated cone seat 41 respectively. The two clamping hooks 45 are hooked to the two sides of the lower end of slidable pressing rod 22 respectively.

On the basis of the above structure, preferably, a number of the elastic ribs 42 is two. The lower ends of the two elastic ribs 42 are fixed to the left side and the right side of the upper surface of the circular ring base 43 respectively. The upper ends of the two elastic ribs 42 are fixed to the front side. The rear side of the lower surface of the truncated cone seat 41 respectively.

On the basis of the above structure, preferably, the two elastic ribs 42 are both in the shape of a bow.

On the basis of the above structure, preferably, the projection of the two elastic ribs 42 on a longitudinal plane is in the shape of “8”.

Figure 10:
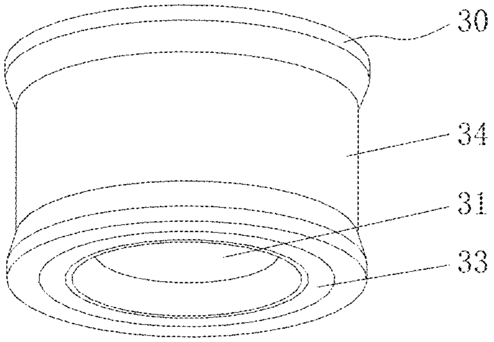
FIG. 10 illustrates a 3D structure diagram of a piston.
Figure 11:
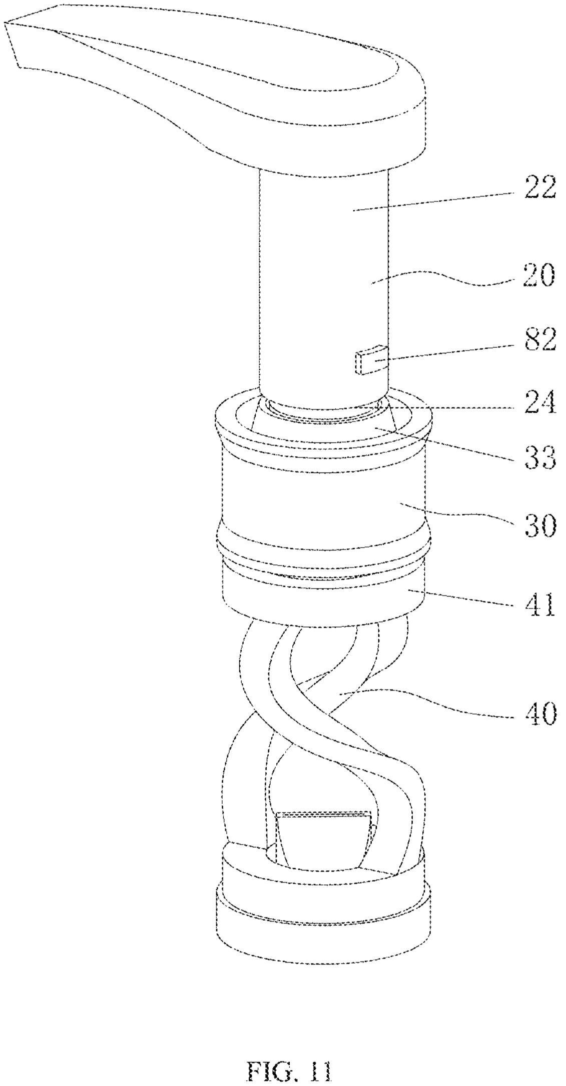
FIG. 11 illustrates a schematic diagram of a connection state between a piston and a pump head, and a spring.

Please refer to FIG. 10 or FIG. 11. On the basis of the above structure, preferably, the piston 30 is of a hollow cylindrical structure.

On the basis of the above structure, to increase the space of the air pressure cavity 11 and the liquid storage cavity 12, furthermore, an annular-shaped end surface groove 33 is formed in the upper end and the lower end of the piston 30, and so that a process of air intake, exhaust, liquid intake and liquid drainage is smoother. Meanwhile, it is beneficial to make the pump body 10 more compact. Preferably, the annular-shaped end surface groove 33 is a V-shaped structure with an opening facing the end surface.

On the basis of the above structure, to reduce a sliding friction resistance between the peripheral side of the piston 30 and the inner wall of the pump body 10, preferably, an annular-shaped side surface groove 34 is formed in the peripheral side of the piston 30. The annular-shaped side surface groove 34 is a C-shaped structure having a large diameter at an upper end and a lower end, and a small middle diameter, thereby reducing a contact area during sliding. The upper end and the lower end of the piston 30 are in sealed sliding connection with the inner wall of the pump body 10.

On the basis of the above structure, preferably, the piston 30 may be made of Thermo-Plastic Elastomer (TPE) or polyethylene (PE) material.

Figure 12:
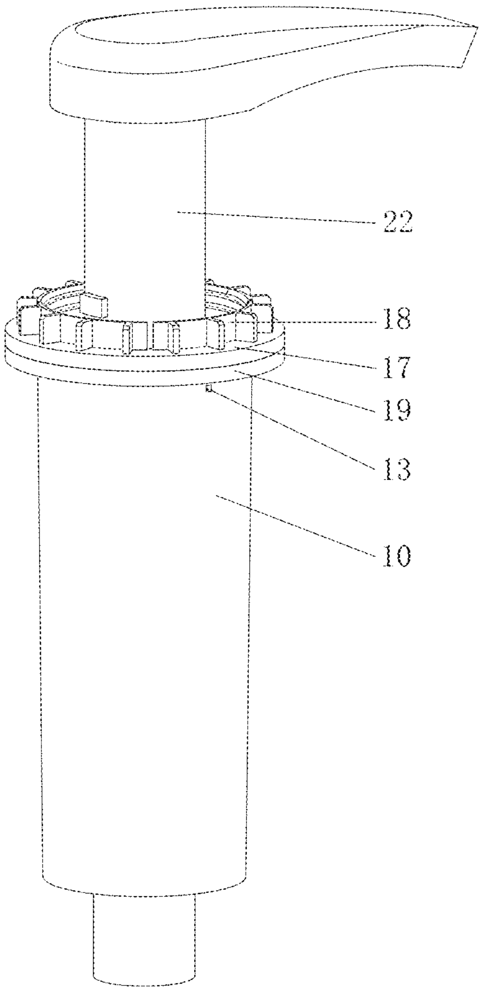
FIG. 12 illustrates a schematic diagram of installing a clamping structure.

Please refer to FIG. 12. As a preferred embodiment, on the basis of the above structure, a clamping structure is arranged on the outer wall of the upper end of the pump body 10. The pump body 10 is clamped inside the threaded cover 50 by means of a clamping structure. Preferably, the clamping structure includes an end surface ring 17. The end surface ring 17 is fixed on the upper end surface of the pump body 10. A plurality of arc-shaped clamping rings 18 are fixed to the upper surface of the end surface ring 17. A plurality of clamping pieces arranged are arranged on each of the clamping rings 18 at intervals. The clamping pieces are clamped with clamping grooves formed in the threaded cover 50.

On the basis of the above structure, preferably, the outer wall of the upper end of the pump body 10 is sleeved with a sealing gasket 19. The sealing gasket 19 is attached to the lower surface of the end surface ring 17.

Figure 13:
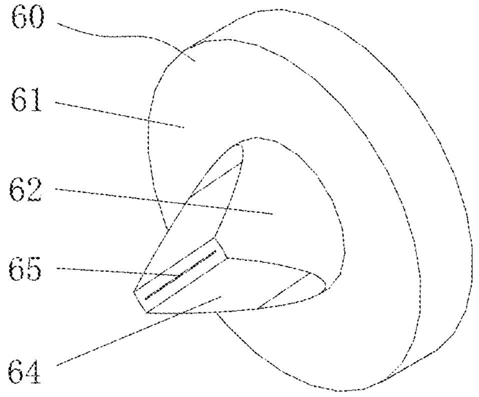
FIG. 13 illustrates a 3D structure diagram of a one-way valve.

Please refer to FIG. 13. As a preferred embodiment, on the basis of the above structure, the one-way valve 60 comprises a valve seat 61 and a valve body 62. The lower end of the valve body 62 and the upper end surface of the valve seat 61 are fixed to form an integrated structure. A liquid inlet channel 63 is formed in the valve body 62, the lower end of the liquid inlet channel 63 extends to the lower end surface of the valve seat 61. Two inclined surfaces 64 are symmetrically arranged on the two sides of the upper portion of the valve body 62. A line-shaped valve port 65 is formed between the two inclined surfaces 64. The line-shaped valve port 65 communicates with the upper end of the liquid inlet channel 63.

In this embodiment, the one-way valve 60 can be formed by integral injection molding of materials such as lubricating oil silica gel and rubber material, so that the one-way valve 60 has a lubricating effect. Preferably, an included angle between each inclined surface 64 and an axial direction of the valve body 62 is 155-165°. Preferably, the angle is 160°.

Figure 14:
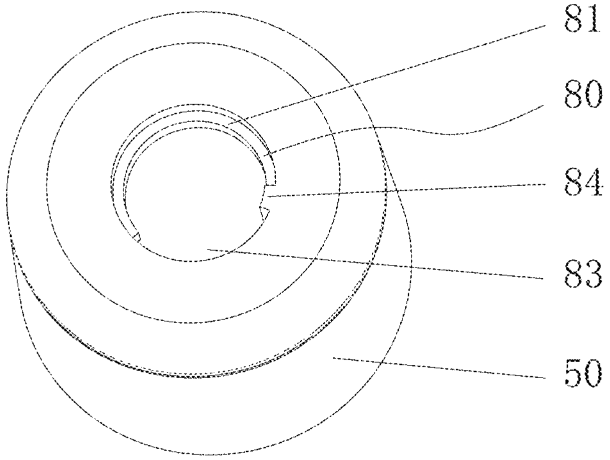
FIG. 14 illustrates a 3D structure diagram of a first embodiment of a threaded cover.
Figure 15:
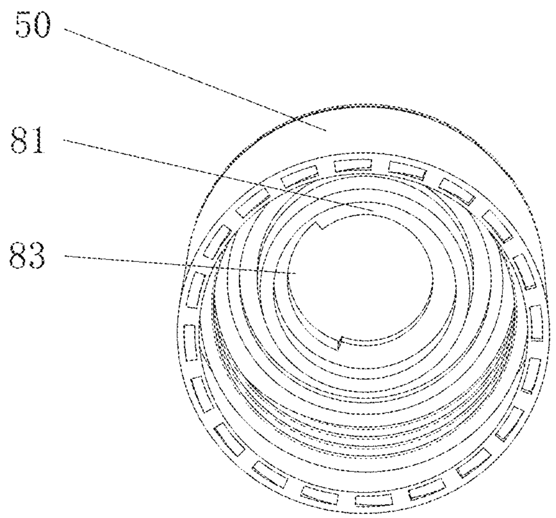
FIG. 15 illustrates a 3D structure diagram of a second embodiment of a threaded cover.
Figure 16:
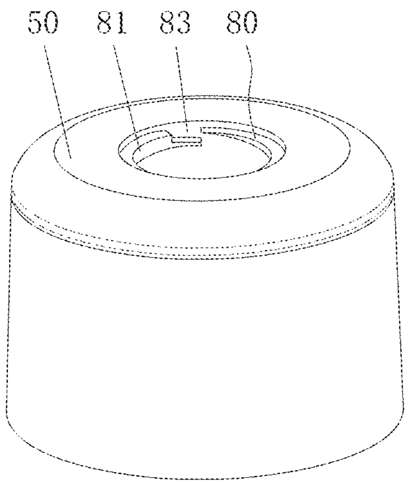
FIG. 16 illustrates a 3D structure diagram of a third embodiment of a threaded cover.

Please refer to FIGS. 14-16. On the basis of the above structure, to avoid the liquid being squeezed out due to the fact that the pump head 20 is pressed due to misoperation and the like, preferably, a locking assembly 80 is placed between slidable pressing rod 22 and the cover hole of the threaded cover 50. The locking assembly 80 includes a locking ring 81 and a locking block 82. The locking ring 81 is of a spiral annular structure and is provided with a notch 83 allowing the locking block 82 to pass through. The locking ring 81 is integrally formed in the upper end of the cover hole. The locking block 82 is fixed on the outer wall of slidable pressing rod 22. The locking block 82 is driven by slidable pressing rod 22 to pass through the notch 83 or matched with the locking ring 81 to prevent slidable pressing rod 22 from ascending and descending.

As an embodiment, please refer to FIG. 14 or FIG. 15. The notch 83 is a vertical opening extending linearly along the axial direction of the threaded cover 50. When the locking assembly 80 needs to be normally used, slidable pressing rod 22 can be manually controlled to rotate, and the locking block 82 is driven to rotate to the position above the notch 83. The pump head 20 is pressed to drive slidable pressing rod 22 to press the spring 40, so that the liquid in the bottle body is extruded from the liquid outlet 21 for use. When the pump head 20 is pressed due to the fact that the pump head 20 is pressed due to misoperation and the like, slidable pressing rod 22 is manually controlled to rotate to drive the locking block 82 to rotate to the upper surface of the locking ring 81, so that the locking block 82 is clamped and supported on the locking ring 81, slidable pressing rod 22 is limited to descend, and therefore locking of the pump head

20 is achieved. In order to limit the locking block 82 to slide off from any one of ends of the locking ring 81, furthermore, a limited block 84 is fixed on the upper surface of any one of ends of the locking ring 81.

As another embodiment, please refer to FIG. 16. The notch 83 is a spiral opening spirally extending in the cover hole of the threaded cover 50. When the locking assembly 80 needs to be normally used, slidable pressing rod 22 can be manually controlled to rotate, the locking block 82 is driven to rotate to the position above the notch 83, and then the locking block 82 is pressed and rotated to pass through the notch 83, so that the locking block 82 enters the position below the locking ring 81. The pressing pump head 20 drives slidable pressing rod 22 to press the spring 40, so that the liquid in the bottle body is extruded from the liquid outlet 21 for use. When the locking is needed, slidable pressing rod 22 can be manually controlled to rotate so as to drive the locking block 82 to rotate to return to the position above the locking ring 81 through the notch 83, so that the locking block 82 is clamped and supported on the locking ring 81 to limit the descending of slidable pressing rod 22, and the locking of the pump head 20 is achieved.

The working principle of the invention is as follows.

The peripheral side of the piston 30 is in sealed sliding connection with the inner wall of the pump body 10, so that the piston 30 can divide the inner space of the pump body 10 into the air pressure cavity 11 and the liquid storage cavity 12 which are arranged from up to down. The upper end of the spring 40 and the piston 30 are driven by slidable pressing rod 22 to ascend and descend by reasonably optimizing the structure of each part and the connection relationship between the parts. Due to the fact that the downward pressing distance between the first shaft shoulder 24 and the piston 30 is larger than the downward pressing distance between the second shaft shoulder 25 and the spring 40, the spring 40 and the piston 30 can ascend and descend asynchronously, and reasonable and efficient control over air inlet and the liquid outlet 21 of the bottle body is achieved. When slidable pressing rod 22 presses the spring 40, the second shaft shoulder 25 firstly presses against the upper end of the spring 40 to press down to drive the upper end of the spring 40 to move downwards. At this time, the spring 40 is compressed, and the conical surface 44 of the spring 40 is separated from the conical opening 32 of the axial through hole 31 to be opened, so as to control the liquid passing gap 15 to be in communication with the liquid outlet cavity 14. The internal space of the liquid storage cavity 12 is reduced. Liquid pressure in the liquid storage cavity 12 is increased. The liquid in the liquid storage cavity 12 is extruded out of the liquid outlet 21 after passing through the liquid gap, the liquid outlet cavity 14 and the liquid outlet channel 23 in sequence. During the pressing of the spring 40, the two inclined faces of the one-way valve 60 close the line-shaped valve port 65 under the action of the liquid in the liquid storage cavity 12. As slidable pressing rod 22 continues to press the upper end of the spring 40, the first shaft shoulder 24 presses against the upper end of the piston 30 to drive the piston 30 to move down together with the spring 40. At this time, the liquid passing gap 15 is kept in communication with the liquid outlet cavity 14. The internal space of the air pressure cavity 11 suddenly increases to form a negative pressure. The outside atmosphere enters the air pressure cavity 11 through the air inlet gap 51. When the piston 30 moves downwards away from the vent hole 13, the vent hole 13 can be controlled to be in communication with the air pressure cavity 11. Air in the air pressure cavity 11 passes through the vent hole 13, and the threaded cover 50 enters the bottle body. The liquid of the bottle body is subjected to atmospheric pressure. After the downward pressure of slidable pressing rod 22 on the upper end of the spring 40 is removed, the spring 40 drives the upper end of the spring 40 to reset through an elastic force of the spring 40, so that the internal space of the liquid storage cavity 12 becomes large, and the liquid pressure becomes small. Under the action of the atmospheric pressure, the liquid of the bottle body passes through the line-shaped valve port 65 of the one-way valve 60 through the suction pipe 70 and enters the liquid storage cavity 12. As the upper end of the spring 40 continues to move upwards, the conical surface 44 of the spring 40 is tightly attached to the conical opening 32 of the axial through hole 31 to be closed, so as to control the disconnection between the liquid passing gap 15 and the liquid outlet cavity 14, and drive the piston 30 to move up together. At this time, the disconnection between the liquid passing gap 15 and the liquid outlet cavity 14 is maintained. After the upper end of the spring 40 is reset, the peripheral side of the piston 30 shields the vent hole 13 to control the disconnection between the vent hole 13 and the air pressure cavity 11, thereby preventing the liquid in the bottle body from being affected by external air. The above schemes make a gas flow path and a liquid flow path more reasonable, and can have a large suction force to quickly adsorb the liquid under a mutual cooperation of the gas flow path and the liquid flow path.

The above working principle makes the gas flow path and the liquid flow path more reasonable, and can have a large suction force to quickly adsorb the liquid under a mutual cooperation of the gas flow path and the liquid flow path.

It should be noted that the embodiments number of this disclosure above is for description only and do not represent the advantages or disadvantages of embodiments. And in this disclosure, the term "including", "include" or any other variants is intended to cover a non-exclusive contain. So that the process, the devices, the items, or the methods includes a series of elements not only include those elements, but also include other elements not clearly listed, or also include the inherent elements of this process, devices, items, or methods. In the absence of further limitations, the elements limited by the sentence "including a . . . " do not preclude the existence of other similar elements in the process, devices, items, or methods that include the elements.

The above disclosed preferred embodiments of the invention are intended only to assist in the elaboration of the invention. The preferred embodiment does not elaborate on all the details and does not limit the invention to a specific embodiment. Obviously, according to the contents of this instruction manual, a lot of amendments and changes can be made. These embodiments are selected and described in detail in this specification for the purpose of better explaining the principle and practical application of the invention, so that the technical personnel in the technical field can better understand and utilize the invention. The invention is limited only by the claims and their full scope and equivalents.

The above are only the preferred embodiments of this disclosure and do not therefore limit the patent scope of this disclosure. And equivalent structure or equivalent process transformation made by the specification and the drawings of this disclosure, either directly or indirectly applied in other related technical fields, shall be similarly included in the patent protection scope of this disclosure.

The invention claimed is:

1. A full-plastic liquid pump, comprising a plastic molding pump body, a pump head, a piston, a spring, a threaded cover, a one-way valve, and a suction pipe, two ends of the pump head respectively defining a liquid outlet and providing a slidable pressing rod, the slidable pressing rod internally providing with a liquid outlet channel in communication with the liquid outlet, a middle portion of the slidable pressing rod movably passing through a cover hole formed in a center of an upper end of the threaded cover, an air inlet gap being formed between the peripheral side of slidable pressing rod and the cover hole, the interior of the upper end of the threaded cover coaxially and fixed with an upper end of the pump body, a peripheral side of the piston is in sealed sliding connection with the inner wall of the pump body, the piston dividing the inner space of the pump body into an air pressure cavity and a liquid storage cavity arranged from up to down, the air pressure cavity communicated with the outside atmosphere via the air inlet gap, a vent hole being defined in the side wall of the upper portion of the pump body, and the vent hole being communicated with the air pressure cavity under a control of the piston; an axial through hole being defined in a center of the piston, an inner wall surrounding the axial through hole hermetically and slidably connected with a peripheral side of a lower end of the slidable pressing rod, a liquid outlet cavity formed between the lower end of the slidable pressing rod and the axial through hole, the liquid outlet cavity communicating with the liquid outlet channel, a lower end of the spring being fixed in a lower end of the liquid storage cavity, a liquid passing gap being formed between a peripheral side of the spring and the inner wall of the liquid storage cavity, the lower end of the slidable pressing rod connected with an upper end of the spring, the slidable pressing rod driving the upper end of the spring and the piston up and down to control the liquid passing gap to communicate or un-communicate with the liquid outlet cavity, a bottom of the liquid storage cavity communicating with an upper end of the suction pipe, the one-way valve being fixed in the liquid storage cavity to correspond to the suction pipe to control liquid to flow unidirectionally from the suction pipe to the liquid storage cavity.

2. The full-plastic liquid pump according to claim 1, wherein the full-plastic liquid pump further comprises a locking assembly, the locking assembly comprises a locking ring and a locking block, the locking ring is of a spiral annular structure and is provided with a notch allowing the locking block to pass through, the locking ring is integrally formed in an upper end of the cover hole, the locking block is fixed on an outer wall of slidable pressing rod, the locking block is driven by slidable pressing rod to pass through the notch or matched with the locking ring to prevent the slidable pressing rod from ascending and descending.

3. The full-plastic liquid pump according to claim 1, wherein the spring comprises a truncated cone seat, an elastic rib, and a circular ring base, the truncated cone seat and the circular ring base are fixed by a plurality of the elastic ribs arranged at intervals along the circumferential side to form an integrated structure, the circular ring base is fixed at a lower part of the liquid storage cavity, the liquid passing gap is formed between the peripheral side of the truncated cone seat and the inner wall of the liquid storage cavity, the truncated cone seat is provided with a conical surface, the conical surface is matched with a conical opening formed in a lower end of the axial through hole for controlling connection and disconnection between the liquid passing gap and the liquid outlet cavity, two clamping hooks are arranged on the two sides of a top of the truncated cone seat respectively, and the two clamping hooks are hooked to two sides of the lower end of slidable pressing rod respectively.

4. The full-plastic liquid pump according to claim 3, wherein a quantity of the elastic ribs is two, lower ends of the two elastic ribs are fixed to a left side and a right side of an upper surface of the circular ring base respectively, upper ends of the two elastic ribs are fixed to a front side, and a rear side of a lower surface of the truncated cone seat respectively.

5. The full-plastic liquid pump according to claim 1, wherein a lower portion of slidable pressing rod is provided with a first shaft shoulder for pressing an upper end of the piston, a lower end of slidable pressing rod is provided with a second shaft shoulder for pressing an upper end of the spring, and a hook groove for connecting a spring clamping hook, a downward pressing distance between the first shaft shoulder and the piston is greater than that between the second shaft shoulder and the spring.

6. The full-plastic liquid pump according to claim 1, wherein a limiting ring is arranged in the upper end of the threaded cover, a lower end of the limiting ring extending into the pump body is configured to limit the piston to move upwards; an outer wall of the limiting ring is engaged with a thread of an inner wall of the upper end of the pump body.

7. The full-plastic liquid pump according to claim 1, wherein a clamping structure is arranged on an outer wall of the upper end of the pump body, the clamping structure comprises an end surface ring, the end surface ring is fixed on an upper end surface of the pump body, a plurality of arc-shaped clamping rings are fixed to the upper surface of the end surface ring, a plurality of clamping pieces arranged at intervals are arranged on each of the clamping rings, the clamping pieces are clamped with a clamping groove formed in the threaded cover.

8. The full-plastic liquid pump according to claim 7, wherein the outer wall of the upper end of the pump body is sleeved with a sealing gasket, the sealing gasket is attached to a lower surface of the end surface ring.

9. The full-plastic liquid pump according to claim 1, wherein the piston is in a hollow cylindrical shape, an annular-shaped end surface groove is formed in an upper end and a lower end of the piston, an annular-shaped side surface groove is formed in a peripheral side of the piston.

10. The full-plastic liquid pump according to claim 1, wherein the one-way valve comprises a valve seat and a valve body, the lower end of the valve body and the upper end surface of the valve seat are fixed to form an integrated structure, a liquid inlet channel is formed in the valve body, the lower end of the liquid inlet channel extends to the lower end surface of the valve seat, two inclined surfaces are symmetrically arranged on the two sides of the upper portion of the valve body, a line-shaped valve port is formed between the two inclined surfaces, the line-shaped valve port communicates with the upper end of the liquid inlet channel.

* * * * *